Figure 1:
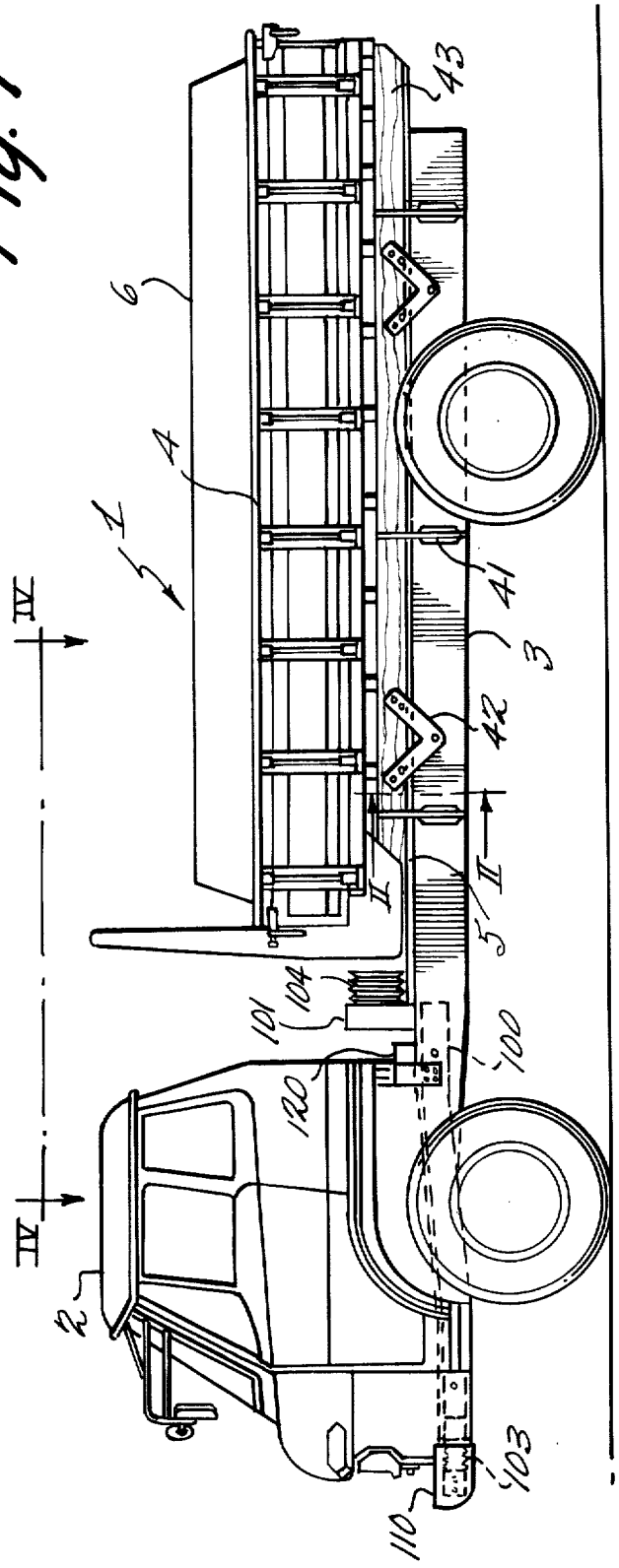

United States Patent [19]

Yamanaka

[11] 3,955,640

[45] May 11, 1976

[54] ABSORBING SAFETY ARRANGEMENT FOR A TRUCK

[75] Inventor: Akira Yamanaka, Yokohama, Japan

[73] Assignee: Mitsubishi Jidosha Kogyo Kabushiki Kaisha, Tokyo, Japan

[22] Filed: Aug. 23, 1974

[21] Appl. No.: 500,014

[52] U.S. Cl. .............................. 180/91; 188/1 C; 293/69 R; 280/748; 296/28 M; 296/35 A
[51] Int. Cl.² ........................................ B60R 21/02
[58] Field of Search ............... 180/82 R, 89 R, 91, 180/103, 1 R; 280/150 B, 80 B; 296/35 A, 65 A, 28 M, 35 R; 188/1 C; 293/69 R, 63, 89

[56] References Cited
UNITED STATES PATENTS

| | | | |
|---|---|---|---|
| 2,355,528 | 8/1944 | Harper | 296/35 R |
| 2,900,036 | 8/1959 | Blake | 296/65 A |
| 3,381,995 | 5/1968 | Carter | 296/35 R |
| 3,463,501 | 8/1969 | Field | 296/35 R |
| 3,672,697 | 6/1972 | Knowles | 180/82 R |
| 3,743,347 | 7/1973 | Shaw | 296/65 A X |
| 3,806,184 | 4/1974 | Dean | 180/91 X |
| 3,851,722 | 12/1974 | Grosseau | 180/82 R |
| 3,861,736 | 1/1975 | Rössler | 296/28 M |

FOREIGN PATENTS OR APPLICATIONS 938,454  10/1963  United Kingdom ............. 296/28 M

*Primary Examiner*—Robert R. Song
*Assistant Examiner*—John P. Silverstrim
*Attorney, Agent, or Firm*—Cushman, Darby & Cushman

[57] ABSTRACT

A truck described herein comprises a movable loading table, energy absorber means and energy transmission means. The loading table is mounted on a body frame of the truck in such manner that it may move in the forward direction along said body frame when an impact force larger than a predetermined value is applied to a vehicle body of said truck. The energy absorber means is interposed between said body frame and said loading table for absorbing kinetic energy possessed by said loading table. The energy transmission means has its front end connected to a front bumper and is provided with an end portion located behind the cabin of the truck so as to be positioned in the path of said moving loading table. The energy transmission means is mounted on the body frame of said truck in such manner that it may move in the forward or backward direction along said frame body when an impact force larger than a predetermined value is applied thereto. The energy transmission means is mounted on the frame body by a bolt fixedly secured to either said energy transmission means or said body frame and extending through a center of a slot formed in forward and backward directions in the other of said transmission means or body frame to couple both of said members together. Upon movement of said energy transmission means in the forward or backward direction, said bolt is adapted to expand the slot, resulting in its plastic deformation.

3 Claims, 8 Drawing Figures

U.S. Patent  May 11, 1976  Sheet 1 of 3  3,955,640

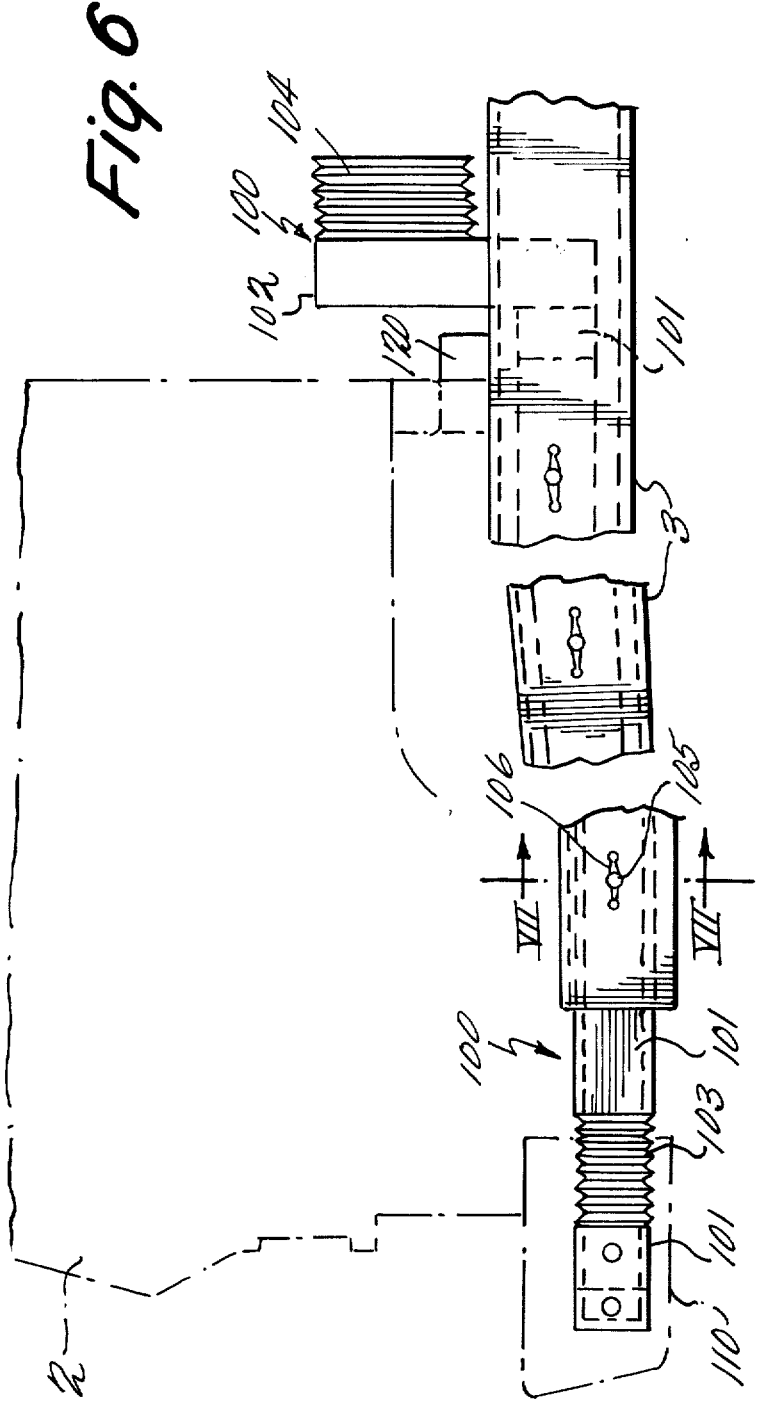
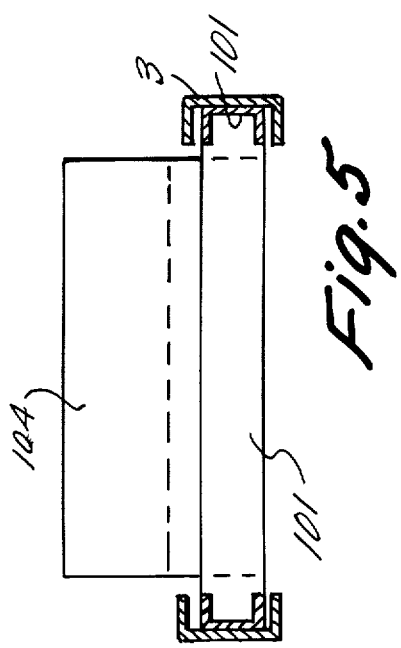
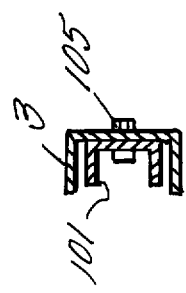

ABSORBING SAFETY ARRANGEMENT FOR A TRUCK

The present invention relates to a truck in which provision is made to mitigate an impact force exerted upon riders of the truck upon collision.

Heretofore, an energy absorber for protecting riders of a truck upon its collision such as, for example, a bumper could not sufficiently absorb impact energy unless it were constructed in a larger scale than that used for passenger cars because a total vehicle weight under loaded condition of a truck is large. Furthermore, since kinetic energy is increased by a loading table and goods loaded thereon, and is large with respect to the energy absorbing capability upon impact inherent to a vehicle body frame due to its plastic deformation, G (deceleration) applied to the riders upon collision becomes large, so that energy absorbers of the prior art are quite unsatisfactory for assuring safety of the riders.

An object of the present invention is to provide a novel truck which is free from the aforementioned disadvantages in the prior art.

According to one feature of the present invention, there are provided a loading table which can move in the forward direction along a vehicle body frame when an impact force larger than a predetermined value is applied to a vehicle body in the forward or backward direction, energy absorber means interposed between said vehicle body frame and said loading table for absorbing a kinetic energy possessed by said loading table, and energy transmission means having its front end connected to a front bumper and provided with an end portion located behind the cabin of the truck so as to be positioned in the path of said moving loading table. The energy transmission means is mounted on the body frame of said truck in such manner that the energy transmission means may move in the forward or backward direction along said frame body when force larger than predetermined value is applied thereto.

Therefore, when a truck according to the present invention collides with an obstacle or the like and the impact force becomes larger than a predetermined value, the loading table moves along the vehicle frame body in the forward direction, and a considerable part of the kinetic energy possessed by the loading table, as well as the goods loaded thereon, which occupy almost one-half of the total vehicle weight under loaded condition of the truck, can be absorbed by said absorber means. However, in the case where the impact force is extremely large, the kinetic energy cannot be absorbed sufficiently by the absorber means, and so the loading table moves further along the vehicle frame until it strikes against the rear end portion of said energy transmission means. As a result, the kinetic energy is transmitted to the obstacle or the like through said energy transmission means.

Accordingly, only the kinetic energy of that part of the truck exclusive of the loading table (and the goods thereon), that is, only the kinetic energy of the cab, vehicle body frame and the riders (which occupy about one-half of the total vehicle weight under loaded condition of the truck), is primarily applied to the obstacle, so that the G applied to the riders is drastically reduced. Furthermore, in the case where kinetic energy is absorbed sufficiently by said energy absorber means, the kinetic energy possessed by the loading table is directly transmitted to the exterior of the vehicle body through the energy transmission means independently of the cab. Therefore, an advantage is obtained in that there is no fear that such unabsorbed kinetic energy can cause an impact force to be applied to the cab, resulting in an excessive value of G and possible fatal injury to the riders.

Figure 8:
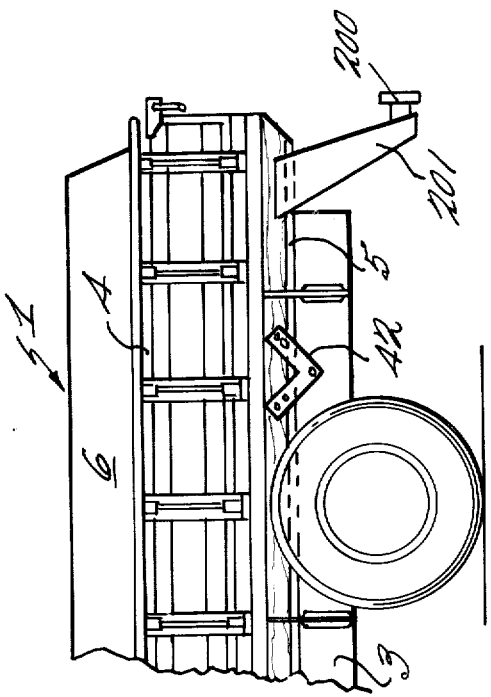
Figure 4:
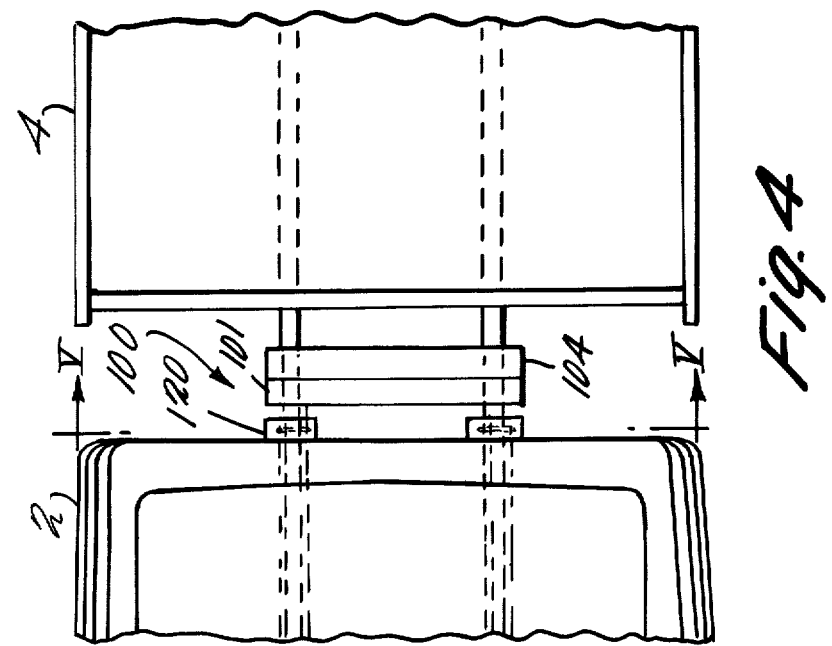
Figure 3:
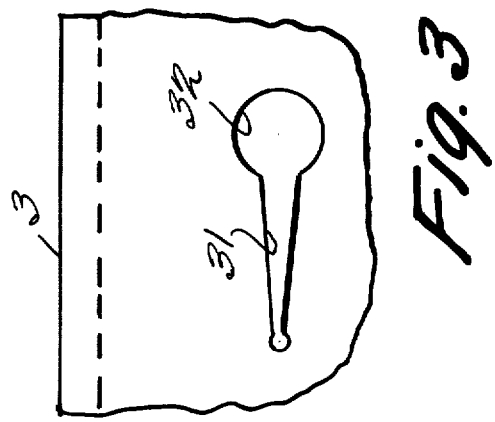
Figure 2:
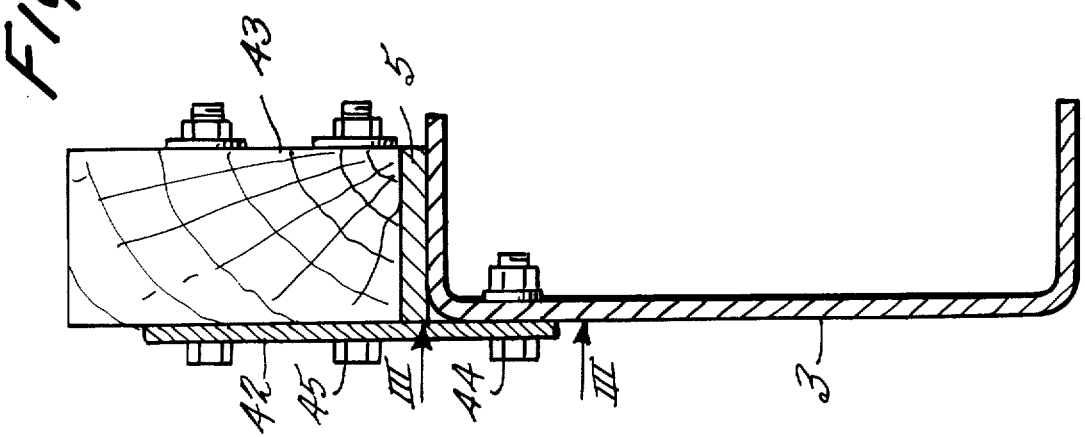

Above-mentioned and other features and objects of this invention will become more apparent by reference to the following description taken in conjunction with the accompanying drawings, in which:

FIG. 1 is a side view showing a first embodiment of the present invention,

FIG. 2 is a cross-section view taken along line II — II in FIG. 1 as viewed in the direction of arrows, FIG. 3 is a cross-section view taken along line III — III in FIG. 2 as viewed in the direction of arrows, FIG. 4 is a partial plan view taken along line IV — IV in FIG. 1 as viewed in the direction of arrows, FIG. 5 is a cross-section view taken along line V — V in FIG. 4 as viewed in the direction of arrows, FIG. 6 is a fragmented side view showing an energy transmission means together with a front bumper and a front part of a vehicle body frame, FIG. 7 is a partial cross-section view taken along line VII — VII in FIG. 6 as viewed in the direction of arrows, and FIG. 8 is a side view showing a second embodiment of the present invention.

Now the present invention will be described in more detail in connection to its preferred embodiments illustrated in the accompanying drawings. Throughout the drawings, similar reference numerals designate equivalent members.

In a preferred embodiment illustrated in FIGS. 1 to 7, a truck 1 comprises a cab 2, a frame 3 and a loading table 4, the cab 2 being fixedly mounted on the frame 3. The loading table 4 is mounted on the frame 3 via its floor joist 43 by means of U-bolts 41 and anti-slip members 42. The U-bolts 41 prevent the loading table 4 from moving up and down, and the anti-slip member 42 consists of a V-shaped plate which is fastened to the floor joist 43 of the loading table 4 by means of bolts 45 and also fastened to the frame 3 by means of bolts 44 which penetrate through bolt holes 32 each associated with a horizontally elongated slot 31, the holes preventing the loading table 4 from moving in the forward or backward direction of the truck 1 under normal conditions. Friction plates 5 provided with contact surfaces having a large coefficient of friction on their upper and lower faces are interposed between the frame 3 and the loading table 4, and on the loading table 4 are loaded goods 6.

In addition, an energy transmission member 100 is provided under the cab 2 extending beyond its front and rear portions. Member 100 comprises a rectangular frame work 101 disposed inside of and in contact with the frame 3, a loading table stopper portion 102 fixedly secured to said frame work so as to project upwardly from its rear end, and buffer members 103 and 104 made of, for example, metallic bellows which are disposed on opposite side portions at the front end of the frame work 101 and on the rear surface of the loading table stopper portion 102, respectively. Also the energy transmission member 100 has the opposite side edges of its frame work 101 fastened to the frame 3 at a number of positions by means of bolts 105 passing through bolt holes 106 formed in said frame 3. Each hole has associated therewith notched slots extending in the forward and backward directions. Furthermore, the front end of the frame work 101 is equipped a front bumper 110.

Owing to the above-described construction, when the truck 1 comes into a head-on collision with another vehicle, the impact force is transmitted from the front bumper 110 to the energy transmission member 100 and the frame 3. Part of the impact energy is absorbed by backward displacement of the buffer members 103 provided in front of the frame work 101, and part is absorbed by the bolts 105 expanding the notched slots which extend backwardly from the bolt holes 106 in the frame 3. However, during the period when the truck 1 is being stopped by the above-referred impact force, because of the large kinetic energy possessed by the loading table 4, especially when loaded with goods 6, an impact force exceeding a predetermined value is applied to the loading table 4, so that the bolt 44 engaging the anti-slip member 42 moves forwardly from the bolt hole 32 in the frame 3 thereby plastically deforming the elongated slot 31 until said bolt 44 has been sheared. Meanwhile, the loading table 4 moves forwardly of the vehicle along the friction plate 5, and owing to the movement along the friction plate 5, the kinetic energy possessed by loading table 4, and the goods 6 loaded thereon is absorbed. When the loading table 4 strikes against the buffer member 104 provided at the loading table stopper portion 102 of the energy transmission member 100 as a result of residual kinetic energy of the loading table 4 and the goods 6 which has not been absorbed by the friction plate 5, kinetic energy possessed by the loading table 4 and the goods 6 can be absorbed at stopper portion 102. Should there be kinetic energy still unabsorbed, the impact force caused by said kinetic energy to stopper portion 102 is applied to the energy transmission member 100. If said impact force is larger than a predetermined value, then the energy transmission member 100 advances causing bolt 105 to expand the notched slot which extends forwardly of the bolt hole 106 in the frame 6, whereby this kinetic energy is absorbed. However, if the kinetic energy is sufficiently large, then the bolt 105 is eventually broken causing the energy transmission member 100 to move forwardly of the vehicle, together with the loading table 4, to push forward the front bumper 110 joined to said energy transmission member 100. The kinetic energy possessed by the loading table 4 and the goods 6 is absorbed by the other vehicle with which the truck has collided. Should there still be residual kinetic energy possessed by the loading table 4 and the goods 6 that has not been absorbed even by the other vehicle, the loading table 4 further moves forwardly, together with the energy transmission member 100 until the table strikes against a stopper 120 fixedly secured onto the frame 3, where movement is terminated.

Accordingly, when the truck 1 collides with another vehicle, if an impact force exceeding a predetermined value is applied to the loading table 4, then the loading table 4 moves forwardly, and thus in the initial moment of collision, the kinetic energy possessed by the loading table 4 and the goods 6 which occupy more than one-half of the total vehicle weight under loaded condition of the truck 1 is not applied to the other vehicle through the frame 3. Instead frame 3 initially is applied with kinetic energy corresponding to a weight one-half or less of the total vehicle weight under loaded condition. Since this kinetic energy is effectively absorbed by the buffer member 103 of the frame work 101 and by the fact that the bolt 105 expands the notched slot that extends rearwardly of the bolt hole 106 in the frame 3 so as to plastically deform said slot, the deceleration G applied to the riders upon collision is reduced in comparison to the case where the truck 1 collides as a whole with another vehicle. Furthermore, since the kinetic energy possessed by the loading table 4 and the goods 6, as they move forwardly along the frame 3 and strike against the energy transmission member 100, is sufficiently absorbed by the friction plate 5, by the buffer member 104 and by the fact that the bolt 105 expands the notched slot that extends forwardly of the bolt hole 106, and since the residual kinetic energy possessed by the loading table 4 and the goods 6 which has not been absorbed by said friction plate 5 and the like is applied to the other vehicle through the energy transmission member 100 rather than being transmitted to the cab 2, the kinetic energy possessed by the loading table 4 and the goods 6 is not transmitted to the riders sitting in the cab 2.

In a second embodiment of the present invention illustrated in FIG. 8, a truck 1 comprises a cab (not shown), a frame 3, a loading table 4, friction plates 5, shear plates 42 and a rear bumper 200. The cab 2 is fixedly secured to the frame 3. The friction plates 5 are fixedly secured to the frame 3. The loading table 4 is placed on the friction plates 5 and is inhibited from moving in the up and down directions by means of U-bolts. The shear plates 42 are adapted to be sheared when an impact force exceeding a predetermined value is applied to the loading table 4, and the rear bumper 200 is fixedly mounted to the loading table 4 via a bumper stay 201.

Owing to the above-described construction, when another vehicle strikes against the rear bumper 200 and an impact force exceeding a predetermined value is applied to the loading table 4 to which the rear bumper 200 is fixedly mounted, the shear plates 42 are sheared, so that the loading table 4 is moved forwardly along the friction plates 5. As a result, the kinetic energy of the loading table 4 is absorbed by the friction between the friction plates 5 and the loading table 4.

Since the kinetic energy applied to the rear bumper 200 by another vehicle is absorbed by the friction between the friction plates 5 and the loading table 4, the impact force applied to the riders sitting in the cab 2 is mitigated.

In the above-described embodiments, the truck 1 was described and illustrated as a cab-over type of truck. However, the present invention is also applicable to a bonnet type of truck with equal effects and advantages.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A truck comprising:
a body frame;
a cab fixed to said frame;
a loading table positioned on the frame rearwardly of the cab;
energy absorber means operatively related to said frame and the table, said energy absorber means including means for joining said table to the frame, said joining means being responsive to a force on said table in excess of a predetermined value for permitting movement of the table with respect to the frame forwardly towards said cab whereby during said movement kinetic energy of said moving table is absorbed by the energy absorber means; and energy transmission means joined by connecting means to said frame forwardly of the table, said energy transmission means including a front portion extending forwardly of the cab and a rear portion interposed between said cab and the table, said connecting means being responsive to impact on either of said front and rear portions in excess of a predetermined magnitude for permitting rearward and forward movement, respectively, of the energy transmission means with respect to the frame whereby kinetic energy developed by said impact is absorbed by the energy transmission means.

2. A truck according to claim 1, wherein one of said energy transmission means and said frame includes a slot having an enlarged central portion, said slot extending in a direction from the front portion towards the rear portion of the energy transmission means; and wherein said connecting means includes a bolt extending through the central portion of the slot to join the frame to the energy transmission means, said bolt being operative upon movement of the energy transmission means with respect to the frame to plastically deform the slot adjacent its central portion.

3. A truck according to claim 1, further comprising a bumper joined to said loading table and extending rearwardly thereof.

* * * * *